United States Patent
Chou et al.

(10) Patent No.: US 11,148,376 B2
(45) Date of Patent: Oct. 19, 2021

(54) AIR COMPRESSOR CAPABLE OF INFLATING AIR AND SUPPLYING SEALANT

(71) Applicants: Wen-San Chou, Tainan (TW); Cheng-Hsien Chou, Tainan (TW)

(72) Inventors: Wen-San Chou, Tainan (TW); Cheng-Hsien Chou, Tainan (TW)

(*) Notice: Subject to any disclaimer, the term of this patent is extended or adjusted under 35 U.S.C. 154(b) by 0 days.

(21) Appl. No.: 16/930,152

(22) Filed: Jul. 15, 2020

(65) Prior Publication Data
US 2021/0016616 A1  Jan. 21, 2021

(51) Int. Cl.
*B29C 73/16* (2006.01)
*B60C 25/00* (2006.01)
*B60S 5/04* (2006.01)
*B29L 30/00* (2006.01)

(52) U.S. Cl.
CPC ............ *B29C 73/166* (2013.01); *B60C 25/16* (2013.01); *B60S 5/043* (2013.01); *B29L 2030/00* (2013.01)

(58) Field of Classification Search
CPC ....... B60C 25/16; B29C 73/166; B60S 5/043; B29L 2030/00

USPC .......................................................... 141/38
See application file for complete search history.

(56) References Cited

U.S. PATENT DOCUMENTS

| | | | |
|---|---|---|---|
| 2013/0284312 A1* | 10/2013 | Chou | F16K 15/20 141/38 |
| 2014/0261878 A1* | 9/2014 | Jhou | B29C 73/166 141/38 |
| 2016/0121563 A1* | 5/2016 | Chou | B29C 73/025 141/38 |

* cited by examiner

*Primary Examiner* — Timothy P. Kelly

(57) ABSTRACT

An air compressor contains: a box in which the air compressor and a sealant supply device are accommodated. The air compressor is configured to produce high-pressure airs, and the sealant supply device has an air inlet pipe and a supply pipe. An air outlet pipe of the air compressor is connected with the air inlet pipe, and the air compressor is detachable from the sealant supply device. The air inlet pipe is configured to receive the high-pressure airs from the air compressor, the supply pipe is configured to output chemical sealant from the sealant supply device, and a tube is configured to communicate the air inlet pipe with the supply pipe. A rotation element includes a driven portion and a central stem. The rotation element is fitted on the second sub-tube. The central stem of the rotation element abuts against a top of the tube.

16 Claims, 7 Drawing Sheets

AIR COMPRESSOR CAPABLE OF INFLATING AIR AND SUPPLYING SEALANT

FIELD OF THE INVENTION

The present invention relates to an air compressor which is capable of compressing air independently or compressing air and supplying sealant.

BACKGROUND OF THE INVENTION

A conventional sealant supply device contains a cover, a can, and a tube, wherein chemical sealant is accommodated in the can. The cover includes two sub-tubes, wherein one of the two sub-tubes is configured to receive high-pressure air from the air compressor, and the other sub-tube is configured to output the chemical sealant. The tubes are in connection with the cover and are received in the can.

A conventional air compressor is accommodated in a box and mates with a sealant supply device detachable from the air compressor. In operation, a delivery hose of an air inlet pipe of the sealant supply device is connected to an air connector of the box, and a feeding hose of a sealant supply pipe of the sealant supply device is coupled to an air nozzle of a broken tire. After starting the air compressor in the box, the chemical sealant in the can of the sealant supply device is pushed into the broken tire, thus repairing the broken tire.

However, the sealant supply device is only applied to repair broken tires but cannot provide high-pressure air independently into the tire, when the tire is not broken.

The present invention has arisen to mitigate and/or obviate the afore-described disadvantages.

SUMMARY OF THE INVENTION

The primary aspect of the present invention is to provide an air compressor which contains a rotation element configured to move a tube so that the air compressor is capable of providing high-pressure air to a tire and supplying chemical sealant to a tire when the tire is broken.

Another aspect of the present invention is to provide an air compressor which contains an air outlet pipe of the air compressor connected with an air inlet pipe of a sealant supply device to reduce the size of the air compressor, and in which the air compressor is detachable from the sealant supply device quickly, thus replacing the sealant supply device easily.

DETAILED DESCRIPTION OF THE PREFERRED EMBODIMENTS

Figure 1:
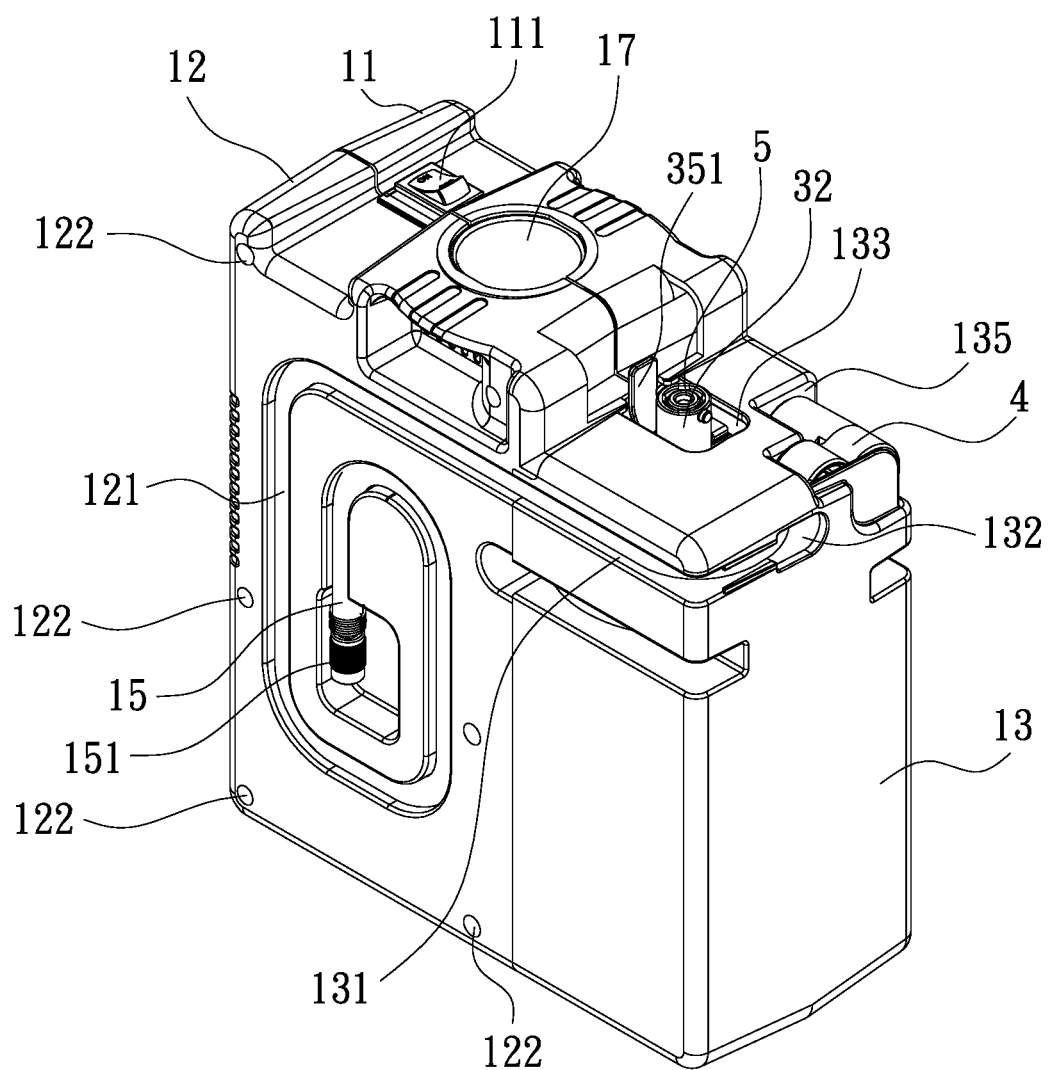
FIG. 1 is a perspective view showing the assembly of an air compressor according to a preferred embodiment of the present invention.
Figure 2:
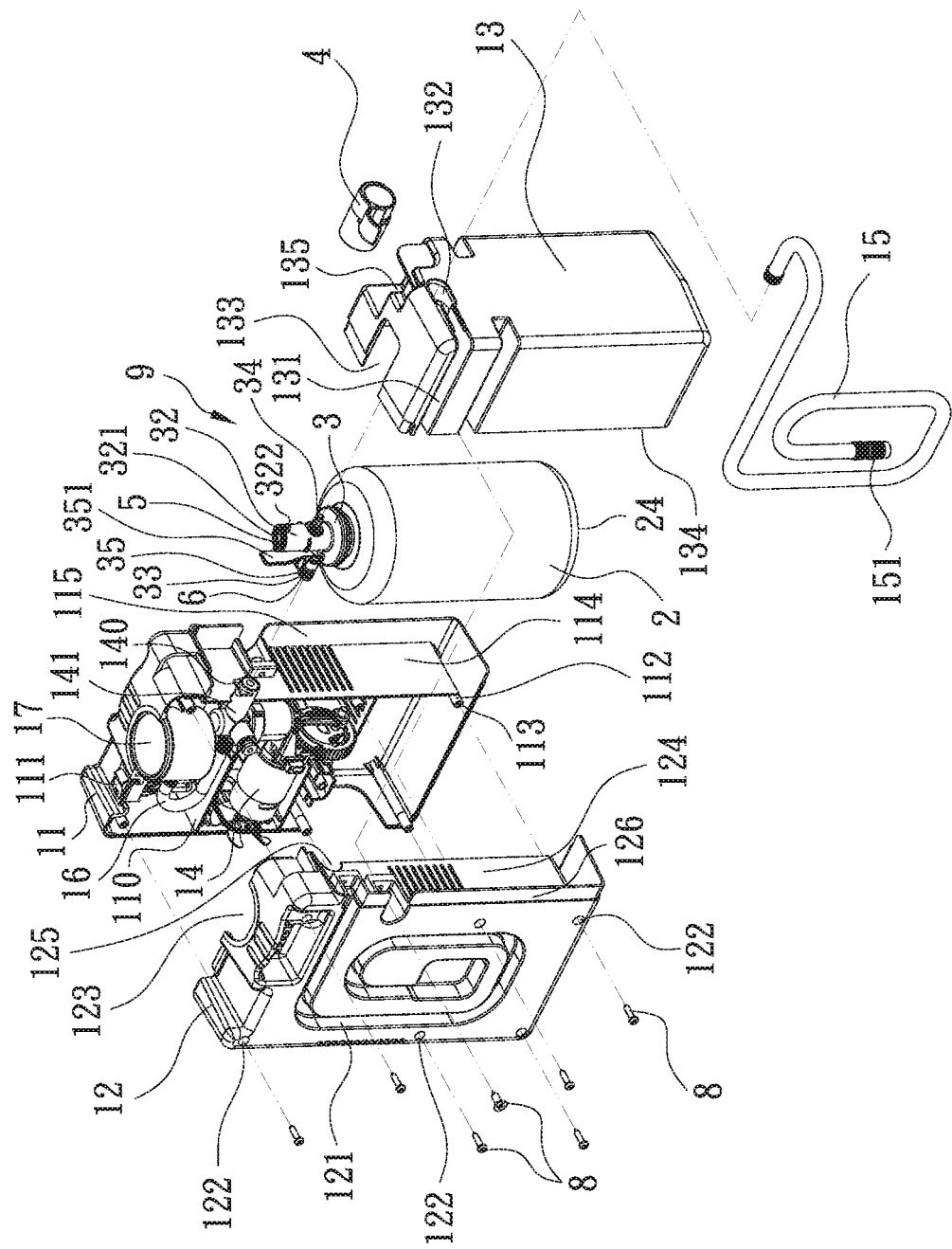
FIG. 2 is a perspective view showing the exploded components of the air compressor according to the preferred embodiment of the present invention.
Figure 3:
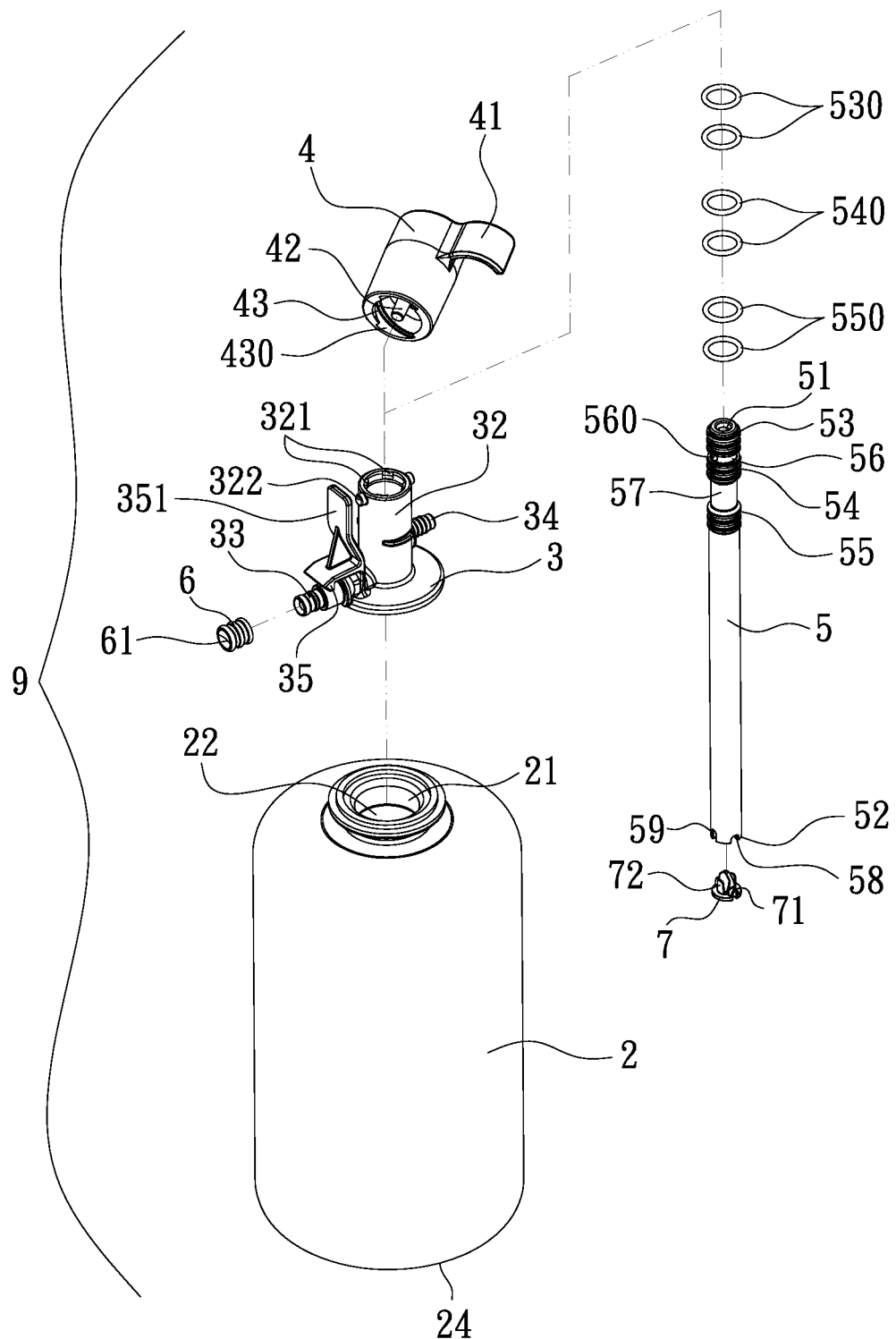
FIG. 3 is a perspective view showing the exploded components of a part of the air compressor according to the preferred embodiment of the present invention.

With reference to FIGS. 1-3, an air compressor 14 according to a preferred embodiment of the present invention comprises: a box, a tire sealant supply device 9, and a pressure gauge 17. The box includes a first shell 11, a second shell 12, and a third shell 13, wherein the first shell 11 has multiple partitions 110 configured to separate the air compressor 14 from the pressure gauge 17 in the first shell 11. A switch 111 is fixed on an outer wall of the first shell 11 and configured to turn on/off the air compressor 14, and multiple locating posts 112 are arranged on the first shell 11, wherein a respective locating post 112 has a positioning orifice 113. The second shell 12 has an open concave portion 121 and multiple through orifices 122, each through orifice 122 corresponding to a respective positioning orifice 113 of the first shell 11, such that multiple fixing elements 8 are locked with the multiple through orifices 122 of the second shell 12 and the multiple positioning orifice 113 of the first shell 11.

A first passing orifice 123 is defined amongst the first shell 11 and the second shell 12 after the first shell 11 and the second shell 12 are connected, such that the pressure gauge 17 is viewable via the first passing through 123.

The first shell 11 has a first side plate 114, and the second shell. 13 has a second side plate 124, wherein a second passing orifice 125 is defined amongst the first side plate 114 and the second side plate 124. The first side plate 114 has a first extension 115 extending therefrom, and the second side plate 124 has a second extension 126 extending therefrom.

The third shell 13 has a defining space 130, a cutout 133 defined on a peripheral side of an upper surface of the third shell 13, a third passing orifice 132, a storage groove 135 adjacent the third passing orifice 132, a recessed portion 131 formed on a side of the third passing orifice 132 and corresponding to the open concave portion 121 of the second shell 12, and an engagement portion 134 arranged on an outer wall of the third shell 13 and engaged with the first extension 115 of the first shell 11 and the second extension 126 of the second shell 12.

A tire sealant supply device 9 is accommodated in the defining space 130 of the third shell 13 and abuts against the first side plate 114 of the first shell 11 and the second side plate 124 of the second shell 12 securely. An air outlet pipe 141 of the air compressor 14 is inserted through the second passing orifice 125. An air inlet pipe 33 of the tire sealant supply device 9 is connected with the air outlet pipe 141, and an engagement portion 35 of the sealant supply device 9 is fixed on a lock plate 140 of the air outlet pipe 141. Thereby, the air inlet pipe 33 of the tire sealant supply device 9 is connected with the air outlet pipe 141 of the air compressor 14 to reduce a size of the air compressor 14, and the air compressor 14 is detachable from the sealant supply device 9, so that replacing the sealant supply device 9 can be done quickly.

A first end of a sealant delivery hose 15 is connected with a supply pipe 34 of the sealant supply device 9, and a second end of the sealant delivery hose 15 has a connector 151 connectable to an air nozzle (not shown). In another embodiment, the connector 151 is a check connector. A first end of an air delivery hose 16 is connected with an air outlet pipe 142 of the air compressor 14, and a second end of the air delivery hose 16 is connected with the pressure gauge 17. When the switch 111 is turned on, high-pressure air inflates a tire from the air outlet pipe 141, the sealant supply device 9, and the sealant delivery hose 15 so as to deliver the high-pressure air or to supply chemical sealant 23, thus repairing a tire when it is broken. Preferably, only the sealant delivery hose is exposed outside the box and is configured to provide the high-pressure air or to supply the chemical sealant 23, wherein the sealant delivery hose is the sealant delivery hose 15.

Figure 4:
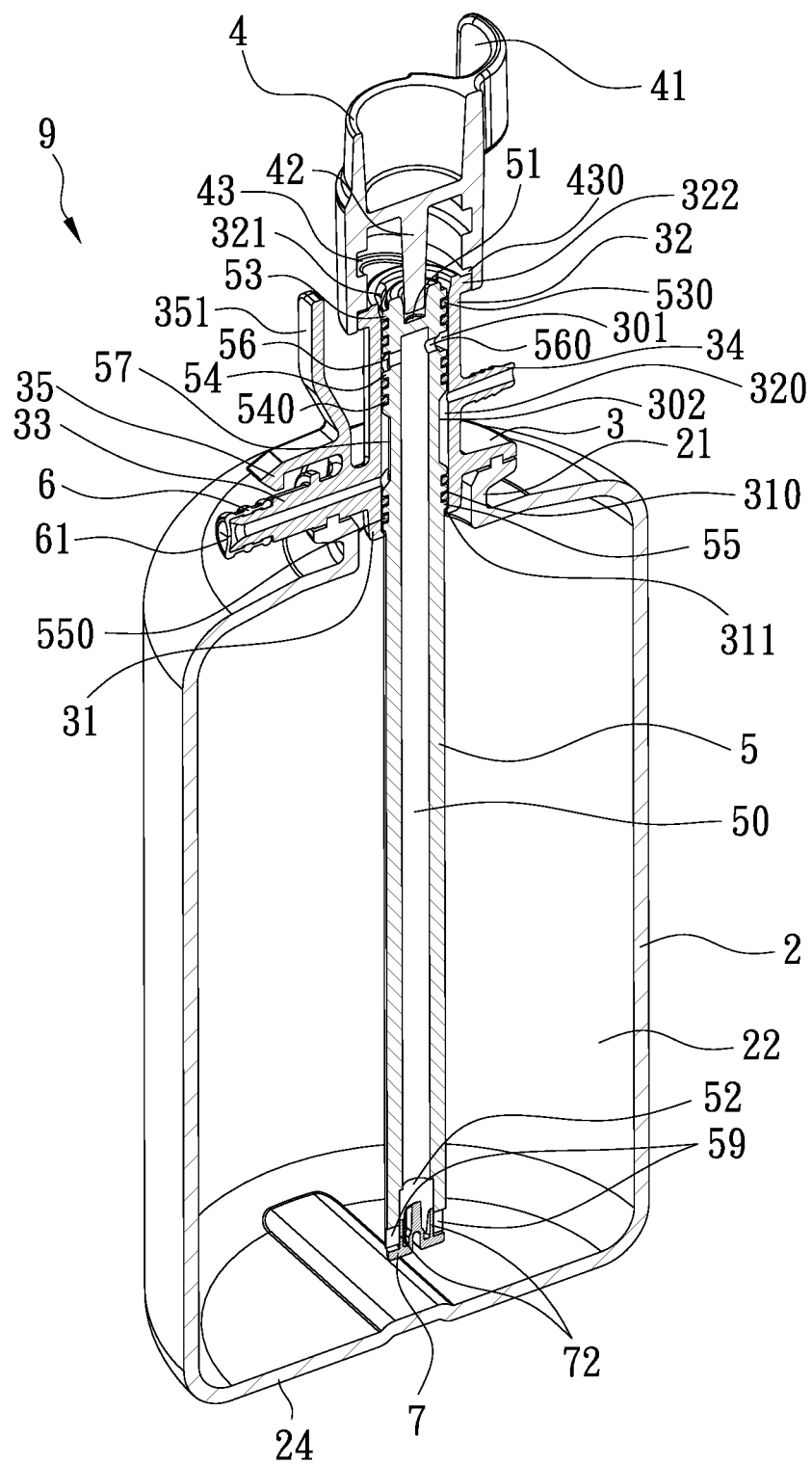
FIG. 4 is a cross-sectional perspective view showing the assembly of a part of the air compressor according to the preferred embodiment of the present invention.
Figure 5:
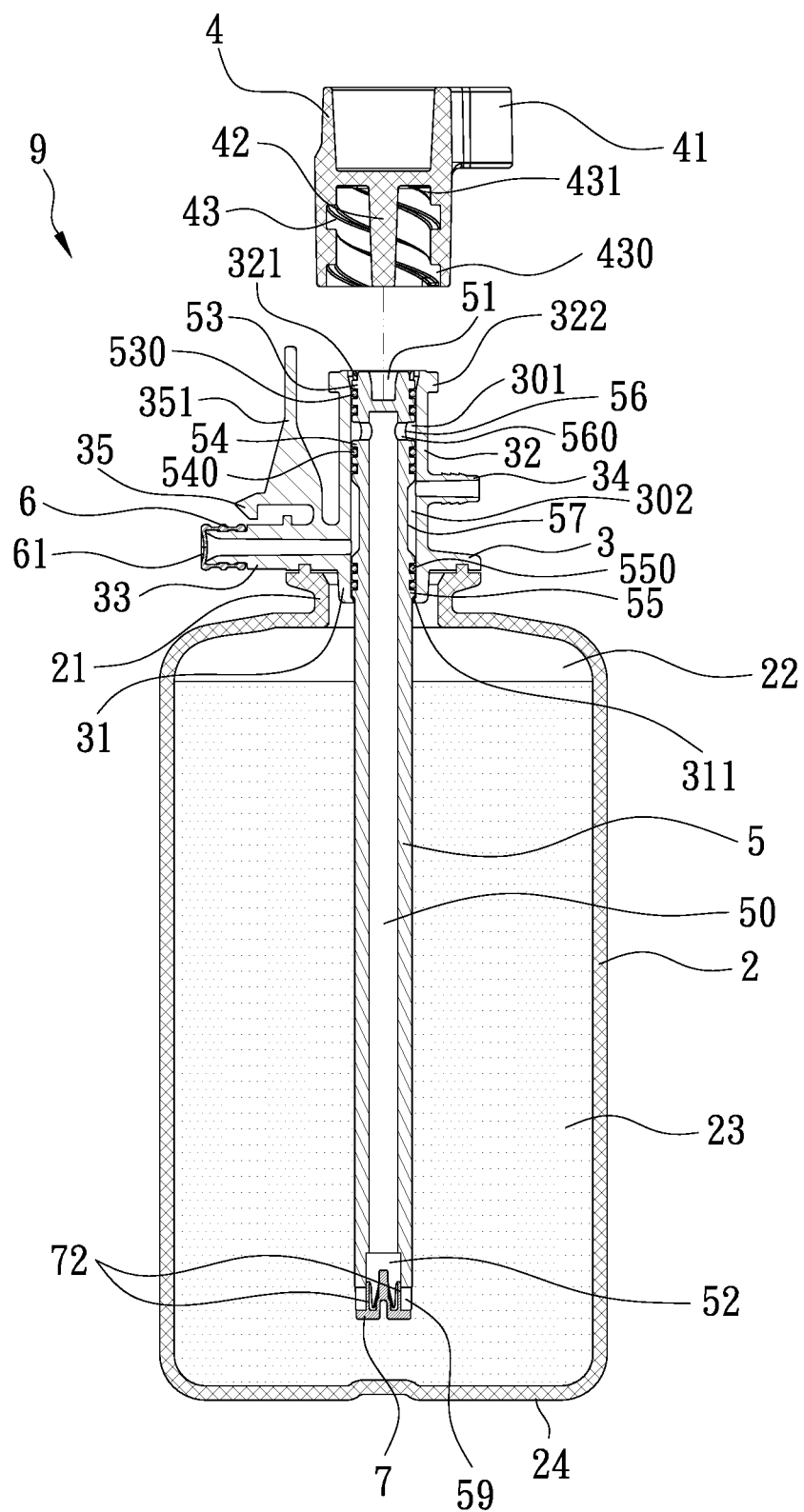
FIG. 5 is a cross sectional view showing the assembly of apart of the air compressor according to the preferred embodiment of the present invention.
Figure 6:
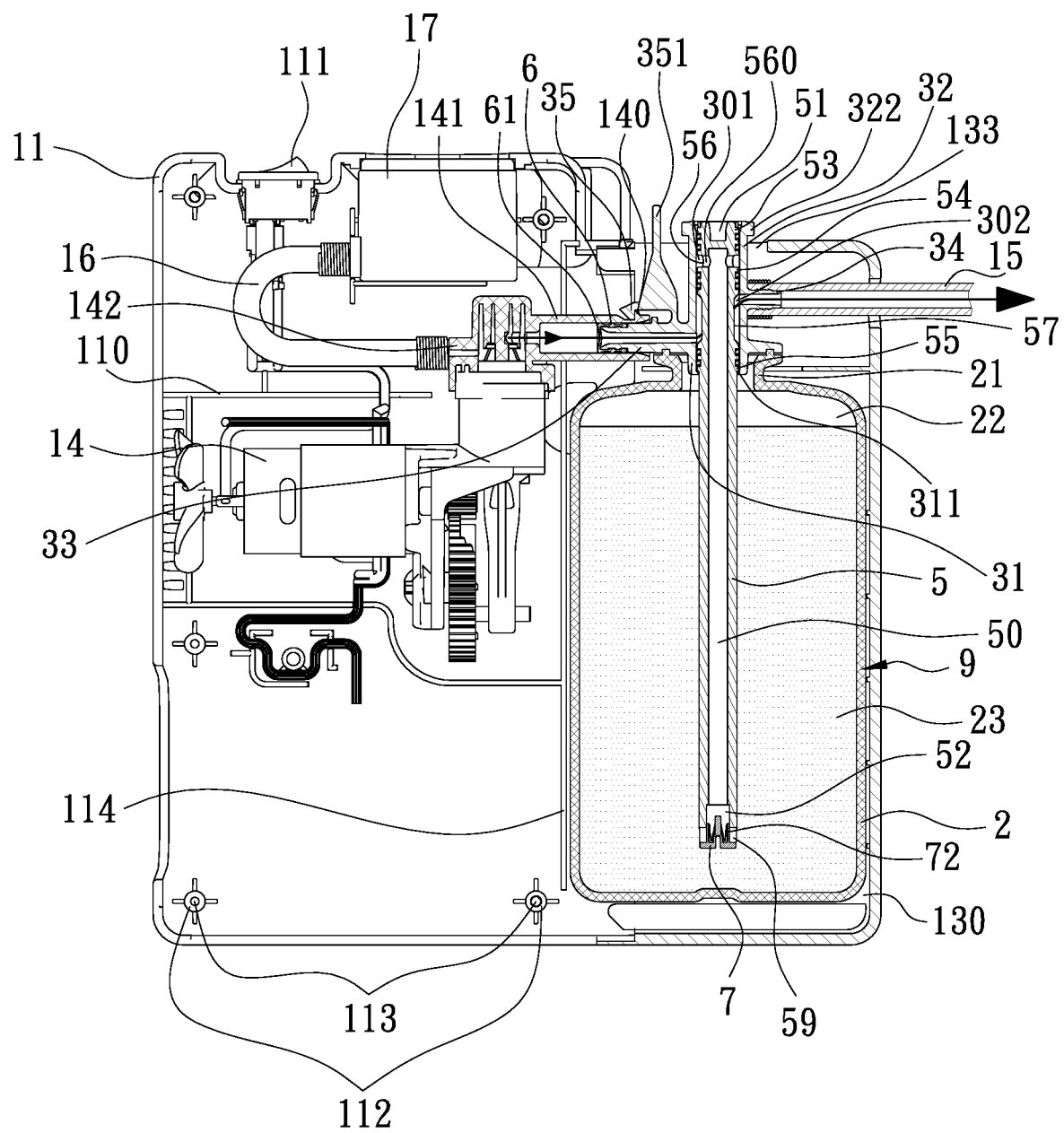
FIG. 6 is a cross sectional view showing the operation of the air compressor according to the preferred embodiment of the present invention.
Figure 7:
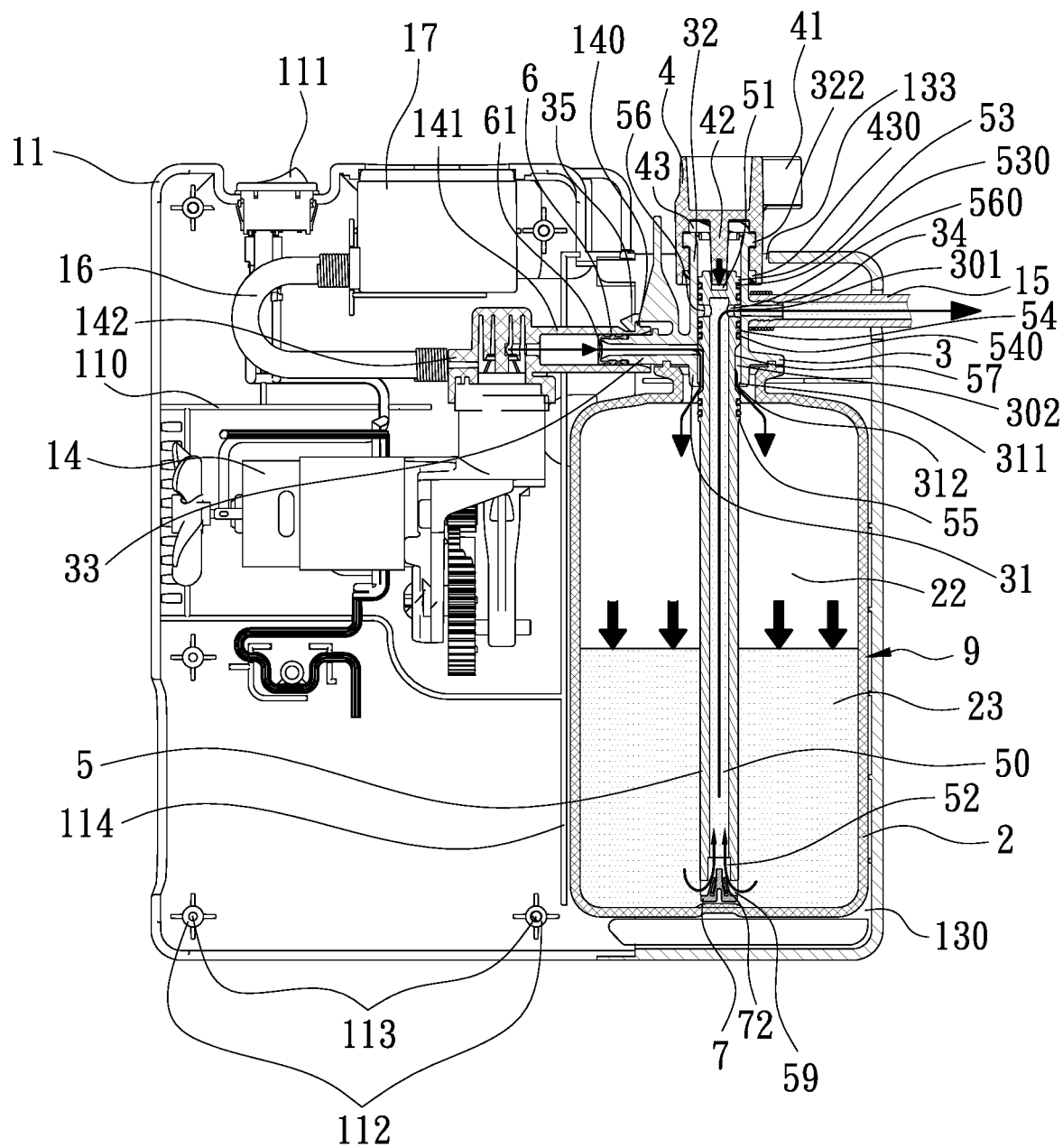
FIG. 7 is another cross sectional view showing the operation of the air compressor according to the preferred embodiment of the present invention.

Referring to FIGS. 3-5, the sealant supply device 9 includes a can 2, a cover 3, and a tube 5. The can 2 is hollow and has an open segment 21, a lower fence 24, an accommodation chamber 22, and the chemical sealant 23 is received in the accommodation chamber 22 (as shown in FIGS. 6 and 7). The cover 3 is connected with the can 2 in a screwing manner and in a hot melting manner. The cover 3 has a first sub-tube 31 extending from a top thereof, and the cover 3 has a second sub-tube 32 extending from a bottom thereof and communicating with the first sub-tube 11, wherein the first sub-tube 31 has a first room 310, and the second sub-tube 32 has a second room 320 communicating with the first room 310. The first sub-tube 31 has a shoulder 311 extending from a bottom thereof, and the shoulder 311 has a central orifice 312 formed on a center thereof and communicating with the first room 310 (as illustrated in FIG. 7), wherein a top of the second sub-tube 32 is opened. The second sub-tube 32 has multiple protrusions 321 extending from an inner wall of the top of the second sub-tube 32, two opposing columns 322 extending from an outer wall of the top of the second sub-tube 32, and the air inlet pipe 33 and the supply pipe 34 are in communication with the second room 320, wherein an operation portion 351 of the engagement portion 35 is disposed on the air inlet pipe 33.

A sleeve 6 has a check film 61 and is fitted on a distal end of the air inlet pipe 33, wherein the sleeve 6 is configured to close the sealant supply device 9 from the air compressor 14 airtightly and to stop the chemical sealant 23 of the sealant supply device 9 flowing back to the air compressor 14.

The tube 5 has a hollow portion 50, a closed notch 51 defined in a top of the tube 5, an opening 52 defined on a bottom of the tube 5, at least two spaced first ribs 53 arranged on an outer wall of the top of the tube 5, at least two second ribs 54, at least two third ribs 55, a first trench 56 defined between the at least two first ribs 53 and the at least two second ribs 54, and a second trench 57 defined between the at least two second ribs 54 and the at least two third ribs 55, wherein the first trench 56 has at least one aperture 560 communicating with the tube 5.

At least two first seal rings 530 are defined between the at least two first ribs 53, at least two second seal rings 540 are defined between the at least two second ribs 54, and at least two third seal rings 550 are defined between the at least two third ribs 55, wherein the tube 5 further has two opposing troughs 58 and at least one conduit 59 which are defined on the bottom of the tube 5.

A plug 7 is configured to close the opening 52 of the tube 5. The plug 7 has two opposing locking portions 71 corresponding to the opposing troughs 58, and the plug 7 has a wing 72 configured to turn on/off the at least one conduit 59 of the tube 5, as shown in FIG. 3.

The tube 5 is put into the second sub-tube 32 and extends out of the central orifice 312 of the shoulder 311 (as illustrated in FIG. 7), and the at least two third ribs 55 of the tube 5 contact with the shoulder 311 of the first sub-tube 31, the at least two first ribs 53 of the tube 5 abut against the multiple protrusions 321 of the second sub-tube 32 so that the at least two first ribs 53, the at least two second ribs 54, and the at least two third ribs 55 of the tube 5 are received in the second sub-tube 32 and the first sub-tube 31 of the cover 3. Hence, a first slit 301 is formed between the first trench 56 and the second sub-tube 32, and a second slit 302 is formed between the second trench 57 and the first sub-tube 31.

As shown in FIG. 3, a rotation element 4 is formed in a lid shape and includes a driven portion 41 arranged on an outer wall thereof, a central stem 42 formed on a center of an inner wall of the rotation element 4, and at least one rail 43 is formed on the inner wall of the rotary element 4. In this embodiment, the at least one rail 43 has double threaded sections. Two opposing slots 430 defined on a start position of the rotation element 4, and a close segment 431 extends upward at the other end of the rotation element 4 (as illustrated in FIG. When the air compressor 14 is not operated, the rotation element 4 is accommodated in the storage groove 135 of the box, as shown in FIGS. 1 and 2.

The tube 5 is disposed on the cover 3, and the cover 3 is connected with the can 2 wherein the first sub-tube 31 of the cover 3 and most (from the at least two third ribs 55 to the bottom of the tube 5) of the tube 5 is accommodated in the accommodation chamber 22 of the can 2, as shown in FIGS. 4 and 5.

With reference to FIGS. 1, 2, and 6, the air compressor 14, the pressure gauge 17, and the sealant supply device 9 are received in the box, wherein the pressure gauge 18 is connected to the air outlet pipe 142 of the air compressor 14 via the air delivery hose 16. The air outlet pipe 141 of the air compressor 14 is inserted through the second passing orifice 125. The air inlet pipe 33 of the sealant supply device 9 is accommodated in the third shell 33 and is connected with the air outlet pipe 141, and the engagement portion 35 of the sealant supply device 9 is fixed on the lock plate 140 of the air outlet pipe 141. The second sub-tube 32 of the sealant supply device 9 is retained in the cutout 133 of the third shell 13, and the supply pipe 34 of the sealant supply device 9 is coupled with the sealant delivery hose 15, while the sealant delivery hose 15 is inserted through the third passing orifice 132 to be accommodated in the recessed portion 131 and the open concave portion 121.

The sealant supply device 9 is received in the box, as shown in FIG. 6. When inflating a tire with high-pressure air, the tube 5 is not forced downward, and the at least two third ribs 55 of the tube 5 contact with the shoulder 311 of the first sub-tube 31 of the cover 3 so that the at least two third ribs 55 of the tube 5 block the central orifice 312 of the shoulder 311 of the cover 3 (as illustrated in FIG. 7), and the high-pressure air flows into the second slit 302 of the second trench 57 of the tube 5 from the air compressor 14 via the air outlet pipe 141, the cheek film 61 of the sleeve 6, the inlet pipe 33, and the second sub-tube 32 of the cover 3 so that the air inlet pipe 33 communicates with the supply pipe 34, and the high-pressure air is outputted out of the supply pipe 34 to inflate the tire independently.

Referring to FIG. 7, when inflating a tire that is broken with high-pressure air, the rotation element 4 is fitted on the second sub-tube 32 of the cover 3 so that the two opposing columns 322 of the second sub-tube 32 enter into the two opposing slots 430 of the rotation element 4 (as illustrated in FIGS. 3 and 4) so that the central stem 42 of the rotation element 4 is engaged in the notch 51 of the tube 5. The rotation element 4 is rotated along the at least one rail 43. Since the central stem 42 of the rotation element 4 is engaged in the notch 51 of the tube 5, the rotation element 4 is rotated downward to actuate the tube 5 to move downward. The at least two third ribs 55 of the tube 5 unblock the central orifice 312 of the shoulder 311 of the cover 3, while the at least two second ribs 54 of the tube 5 stop the air inlet pipe 33 communicating with the supply pipe 34. Hence, the high-pressure air is not outputted out of the supply pipe 34 from the air inlet pipe 33 via the second sub-tube 32 but flews into the accommodation chamber 22 of the can 2 via the second slit 302 of the second trench 57 of the tube 5 and the central orifice 312 of the shoulder 311 of the cover 3, and the high-pressure air forces the chemical sealant 23 in the can 2 to push the wing 72 of the plug 7 so that the at least one conduit 59 of the tube 5 communicates with the accommodation chamber 22 of the can 2, such that the chemical sealant 23 of the can 2 flows out of the first slit 301 via the tube 5, the at least one conduit 59, and the first trench 56 and is delivered to the supply pipe 34. Thereafter, the chemical sealant 23 is delivered to the connector 151 via the sealant delivery hose 15, thus supplying the chemical sealant 23 to the tire which is broken.

As illustrated in FIGS. 6 and 7, the sealant supply device 9 is positioned in the box, the air compressor is configured to provide high-pressure air to the tire and to supply the chemical sealant to the tire by using the rotation element 4 when the tire is broken.

Thereby, the rotation element 4 is configured to move the tube 5 so that the air compressor 14 is capable of inflating the tire with high-pressure air and supplying the chemical sealant to the tire when the tire is broken. Preferably, the air outlet pipe 141 of the air compressor 14 is connected with the air inlet pipe 33 of the sealant supply device 9 to reduce the size of the air compressor, and the air compressor 14 is detachable from the sealant supply device 9 quickly, so that replacing the sealant supply device 9 is easily performed.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:
1. An air compressor system comprising:
a pressure gauge;
a sealant supply device;
an air compressor detachable from the sealant supply device and configured to produce compressed air; and
a box accommodating the pressure gauge, the sealant supply device, and the air compressor, the box comprising:
a first shell, the first shell comprising multiple partitions configured to separate the air compressor from the pressure gauge disposed in the first shell, a switch fixed on an outer wall of the first shell and configured to selectively turn on and off the air compressor, multiple locating posts, and a first side plate, the first side plate comprising a first extension extending therefrom, each locating post comprising a positioning orifice;
a second shell, the second shell comprising a second side plate, an open concave portion, and multiple through orifices, each through orifice corresponding to a respective positioning orifice of the first shell, multiple fixing elements engaged with the multiple through orifices of the second shell and the multiple positioning orifices of the first shell, the second side plate comprising a second extension extending therefrom; and
a third shell, the third shell comprising a defining space, a cutout defined on a peripheral side of an upper surface of the third shell, a storage groove, a recessed portion corresponding to the open concave portion of the second shell, and an engagement portion arranged on an outer wall of the third shell and engaged with the first extension of the first shell and the second extension of the second shell;
wherein a first passing orifice is defined amongst the first shell and the second shell when the first shell and the second shell are connected, the pressure gauge viewable via the first passing orifice; and
wherein the sealant supply device is accommodated in the defining space of the third shell and abuts the first side plate of the first shell and the second side plate of the second shell;
the air compressor comprising an air outlet pipe;
the sealant supply device comprising:
a hollow can comprising an accommodation chamber, a chemical sealant received in the accommodation chamber;
a cover comprising:
a first sub-tube extending from an end of the cover, the first sub-tube comprising a first room, and a shoulder extending from an end of the first sub-tube, the shoulder comprising a central orifice formed on a center thereof and communicating with the first room; and
a second sub-tube extending from another end of the cover, the first sub-tube in communication with the second sub-tube, the second sub-tube comprising a second room communicating with the first room, an end of the second sub-tube being open, the second sub-tube comprising multiple protrusions extending from an inner wall of the end of the second sub-tube, two opposing columns extending from an outer wall of the end of the second sub-tube, the air inlet pipe and the supply pipe in communication with the second room;
an air inlet pipe connected with the air outlet pipe of the air compressor and configured to receive compressed air from the air compressor;
a supply pipe, the supply pipe configured to output the chemical sealant from the can, the inlet pipe and the supply pipe arranged on the second sub-tube of the sealant supply device;
a tube in communication with the accommodation chamber and further configured to communicate the air inlet pipe with the supply pipe so that the compressed air is output from the supply pipe without passing through the accommodation chamber; and
a rotation element fit on the second sub-tube, the rotation element comprising an outer wall and an inner wall, a driven portion arranged on the outer wall, a central stem formed centrally on the inner wall, the rotation element, the central stem abutting against an end of the tube, the rotation element configured so that when the rotation element is rotated on the second sub-tube, the rotation element causes the tube to stop the air inlet pipe from communicating with the supply pipe without communicating through the accommodation chamber, so that the compressed air flows into the accommoda- tion chamber from the air compressor, and the chemical sealant flows into the supply pipe from the tube;

wherein the sealant supply device further comprises an engagement portion, and an operation portion of the engagement portion of the sealant supply device is disposed on the air inlet pipe, and the engagement portion of the sealant supply device is fixable on a lock plate of the air outlet pipe.

2. An air compressor system comprising:
a pressure gauge;
a sealant supply device;
an air compressor detachable from the sealant supply device and configured to produce compressed air; and
a box accommodating the pressure gauge, the sealant supply device, and the air compressor, the box comprising:
  a first shell, the first shell comprising multiple partitions configured to separate the air compressor from the pressure gauge disposed in the first shell, a switch fixed on an outer wall of the first shell and configured to selectively turn on and off the air compressor, multiple locating posts, and a first side plate, the first side plate comprising a first extension extending therefrom, each locating post comprising a positioning orifice;
  a second shell, the second shell comprising a second side plate, an open concave portion, and multiple through orifices, each through orifice corresponding to a respective positioning orifice of the first shell, multiple fixing elements engaged with the multiple through orifices of the second shell and the multiple positioning orifices of the first shell, the second side plate comprising a second extension extending therefrom; and
  a third shell, the third shell comprising a defining space, a cutout defined on a peripheral side of an upper surface of the third shell, a storage groove, a recessed portion corresponding to the open concave portion of the second shell, and an engagement portion arranged on an outer wall of the third shell and engaged with the first extension of the first shell and the second extension of the second shell;
  wherein a first passing orifice is defined amongst the first shell and the second shell when the first shell and the second shell are connected, the pressure gauge viewable via the first passing orifice; and
  wherein the sealant supply device is accommodated in the defining space of the third shell and abuts the first side plate of the first shell and the second side plate of the second shell;
the air compressor comprising an air outlet pipe;
the sealant supply device comprising:
  a hollow can comprising an accommodation chamber, a chemical sealant received in the accommodation chamber;
  a cover comprising:
    a first sub-tube extending from an end of the cover, the first sub-tube comprising a first room, and a shoulder extending from an end of the first sub-tube, the shoulder comprising a central orifice formed on a center thereof and communicating with the first room; and
    a second sub-tube extending from another end of the cover, the first sub-tube in communication with the second sub-tube, the second sub-tube comprising a second room communicating with the first room, an end of the second sub-tube being open, the second sub-tube comprising multiple protrusions extending from an inner wall of the end of the second sub-tube, two opposing columns extending from an outer wall of the end of the second sub-tube, the air inlet pipe and the supply pipe in communication with the second room;
  an air inlet pipe connected with the air outlet pipe of the air compressor and configured to receive compressed air from the air compressor;
  a supply pipe, the supply pipe configured to output the chemical sealant from the can, the inlet pipe and the supply pipe arranged on the second sub-tube of the sealant supply device;
  a tube in communication with the accommodation chamber and further configured to communicate the air inlet pipe with the supply pipe so that the compressed air is output from the supply pipe without passing through the accommodation chamber; and
  a rotation element fit on the second sub-tube, the rotation element comprising an outer wall and an inner wall, a driven portion arranged on the outer wall, a central stem formed centrally on the inner wall, the rotation element, the central stem abutting against an end of the tube, the rotation element configured so that when the rotation element is rotated on the second sub-tube, the rotation element causes the tube to stop the air inlet pipe from communicating with the supply pipe without communicating through the accommodation chamber, so that the compressed air flows into the accommodation chamber from the air compressor, and the chemical sealant flows into the supply pipe from the tube;
wherein a sleeve comprising a check film is fit on a distal end of the air inlet pipe, and the sleeve is configured to close the sealant supply device from the air compressor airtightly to prevent the chemical sealant of the sealant supply device from flowing back to the air compressor.

3. The air compressor system as claimed in claim 1, wherein the supply pipe of the sealant supply device is configured to connect to a sealant delivery hose exposed outside the box, wherein a first end of the sealant delivery hose is connected with the supply pipe of the sealant supply device, and a second end of the sealant delivery hose is connectable to an air nozzle.

4. An air compressor system comprising:
a pressure gauge;
a sealant supply device;
an air compressor detachable from the sealant supply device and configured to produce compressed air; and
a box accommodating the pressure gauge, the sealant supply device, and the air compressor, the box comprising:
  a first shell, the first shell comprising multiple partitions configured to separate the air compressor from the pressure gauge disposed in the first shell, a switch fixed on an outer wall of the first shell and configured to selectively turn on and off the air compressor, multiple locating posts, and a first side plate, the first side plate comprising a first extension extending therefrom, each locating post comprising a positioning orifice;
  a second shell, the second shell comprising a second side plate, an open concave portion, and multiple through orifices, each through orifice corresponding to a respective positioning orifice of the first shell, multiple fixing elements engaged with the multiple through orifices of the second shell and the multiple positioning orifices of the first shell, the second side plate comprising a second extension extending therefrom; and a third shell, the third shell comprising a defining space, a cutout defined on a peripheral side of an upper surface of the third shell, a storage groove, a recessed portion corresponding to the open concave portion of the second shell, and an engagement portion arranged on an outer wall of the third shell and engaged with the first extension of the first shell and the second extension of the second shell;

wherein a first passing orifice is defined amongst the first shell and the second shell when the first shell and the second shell are connected, the pressure gauge viewable via the first passing orifice; and wherein the sealant supply device is accommodated in the defining space of the third shell and abuts the first side plate of the first shell and the second side plate of the second shell;

the air compressor comprising an air outlet pipe;

the sealant supply device comprising:
a hollow can comprising an accommodation chamber, a chemical sealant received in the accommodation chamber;
a cover comprising:
  a first sub-tube extending from an end of the cover, the first sub-tube comprising a first room, and a shoulder extending from an end of the first sub-tube, the shoulder comprising a central orifice formed on a center thereof and communicating with the first room; and
  a second sub-tube extending from another end of the cover, the first sub-tube in communication with the second sub-tube, the second sub-tube comprising a second room communicating with the first room, an end of the second sub-tube being open, the second sub-tube comprising multiple protrusions extending from an inner wall of the end of the second sub-tube, two opposing columns extending from an outer wall of the end of the second sub-tube, the air inlet pipe and the supply pipe in communication with the second room;
an air inlet pipe connected with the air outlet pipe of the air compressor and configured to receive compressed air from the air compressor;
a supply pipe, the supply pipe configured to output the chemical sealant from the can, the inlet pipe and the supply pipe arranged on the second sub-tube of the sealant supply device;
a tube in communication with the accommodation chamber and further configured to communicate the air inlet pipe with the supply pipe so that the compressed air is output from the supply pipe without passing through the accommodation chamber; and
a rotation element fit on the second sub-tube, the rotation element comprising an outer wall and an inner wall, a driven portion arranged on the outer wall, a central stem formed centrally on the inner wall, the rotation element, the central stem abutting against an end of the tube, the rotation element configured so that when the rotation element is rotated on the second sub-tube, the rotation element causes the tube to stop the air inlet pipe from communicating with the supply pipe without communicating through the accommodation chamber, so that the compressed air flows into the accommodation chamber from the air compressor, and the chemical sealant flows into the supply pipe from the tube;

wherein the supply pipe of the sealant supply device is configured to connect to a sealant delivery hose exposed outside the box, wherein a first end of the sealant delivery hose is connected with the supply pipe of the sealant supply device, and a second end of the sealant delivery hose is connectable to an air nozzle; and wherein the tube comprises:
a hollow portion,
a notch defined at an end of the tube,
an opening defined on an opposing end of the tube,
at least two spaced first ribs arranged on an outer wall of the end of the tube,
at least two second ribs,
at least two third ribs,
a first trench defined between the at least two first ribs and the at least two second ribs, and
a second trench defined between the at least two second ribs and the at least two third ribs, wherein the first trench has at least one aperture communicating with an interior of the tube, at least two first seal rings are defined between the at least two first ribs, at least two second seal rings are defined between the at least two second ribs, and at least two third seal rings are defined between the at least two third ribs, wherein the tube further comprises two opposing troughs and at least one conduit which are defined on the opposing end of the tube, a plug configured to close the opening of the tube, the plug comprising two opposing locking portions corresponding to the opposing troughs, and the plug further comprising a wing configured to turn on or off the at least one conduit of the tube;

wherein the tube is disposed in the second sub-tube and extends out of the central orifice of the shoulder, and the at least two third ribs of the tube contact the shoulder of the first sub-tube, the at least two first ribs of the tube abut against the multiple protrusions of the second sub-tube so that the at least two first ribs, the at least two second ribs, and the at least two third ribs of the tube are received in the second sub-tube and the first sub-tube of the cover, a first slit defined between the first trench and the second sub-tube, and a second slit defined between the second trench and the first sub-tube.

5. The air compressor system as claimed in claim 4, wherein:
at least one rail is formed on the inner wall of the rotary element, the at least one rail comprising two opposing slots defined on a start position of the rotation element, and a closed segment extending upward on another end of the rotation element;
the rotation element is accommodatable in the storage groove of the box, the rotation element configured to fit on the second sub-tube of the cover so that the two opposing columns of the second sub-tube enter into the two opposing slots of the rotation element so that the central stem of the rotation element is engaged in the notch of the tube, the rotation element rotatable along the at least one rail;
wherein when the rotation element is rotated downward to actuate the tube to move downward, the at least two third ribs of the tube unblock the central orifice of the shoulder of the cover, the at least two second ribs of the tube stop the air inlet pipe from communicating with the supply pipe without communicating through the accommodation chamber, so that compressed air flows into the accommodation chamber of the can via the second slit of the second trench of the tube and the central orifice of the shoulder of the cover, and the compressed air forces the chemical sealant of the can to push the wing of the plug so that the at least one conduit of the tube communicates with the accommodation chamber of the can, such that the chemical sealant of the can flows out of the first slit via the tube, the at least one conduit, and the first trench and is delivered to the supply pipe.

6. The air compressor system as claimed in claim 4, wherein the sealant delivery hose has a connector fixed on the second end thereof, and the connector is a check connector.

7. The air compressor system as claimed in claim 2, wherein the supply pipe of the sealant supply device is configured to connect to a sealant delivery hose exposed outside the box, wherein a first end of the sealant delivery hose is connected with the supply pipe of the sealant supply device, and a second end of the sealant delivery hose is connectable to an air nozzle.

8. The air compressor system as claimed in claim 7, wherein the sealant delivery hose has a connector fixed on the second end thereof, and the connector is a check connector.

9. The air compressor system as claimed in claim 5, wherein the tube comprises:
a hollow portion,
a notch defined at an end of the tube,
an opening defined on an opposing end of the tube,
at least two spaced first ribs arranged on an outer wall of the end of the tube,
at least two second ribs,
at least two third ribs,
a first trench defined between the at least two first ribs and the at least two second ribs, and
a second trench defined between the at least two second ribs and the at least two third ribs,
wherein the first trench has at least one aperture communicating with an interior of the tube, at least two first seal rings are defined between the at least two first ribs, at least two second seal rings are defined between the at least two second ribs, and at least two third seal rings are defined between the at least two third ribs,
wherein the tube further comprises two opposing troughs and at least one conduit which are defined on the opposing end of the tube, a plug configured to close the opening of the tube, the plug comprising two opposing locking portions corresponding to the opposing troughs, and the plug further comprising a wing configured to turn on or off the at least one conduit of the tube;
wherein the tube is disposed in the second sub-tube and extends out of the central orifice of the shoulder, and the at least two third ribs of the tube contact the shoulder of the first sub-tube, the at least two first ribs of the tube abut against the multiple protrusions of the second sub-tube so that the at least two first ribs, the at least two second ribs, and the at least two third ribs of the tube are received in the second sub-tube and the first sub-tube of the cover, a first slit defined between the first trench and the second sub-tube, and a second slit defined between the second trench and the first sub-tube.

10. The air compressor system as claimed in claim 9, wherein:
at least one rail is formed on the inner wall of the rotary element, the at least one rail comprising two opposing slots defined on a start position of the rotation element, and a closed segment extending upward on another end of the rotation element;
the rotation element is accommodatable in the storage groove of the box, the rotation element configured to fit on the second sub-tube of the cover so that the two opposing columns of the second sub-tube enter into the two opposing slots of the rotation element so that the central stem of the rotation element is engaged in the notch of the tube, the rotation element rotatable along the at least one rail;
wherein when the rotation element is rotated downward to actuate the tube to move downward, the at least two third ribs of the tube unblock the central orifice of the shoulder of the cover, the at least two second ribs of the tube stop the air inlet pipe from communicating with the supply pipe without communicating through the accommodation chamber, so that compressed air flows into the accommodation chamber of the can via the second slit of the second trench of the tube and the central orifice of the shoulder of the cover, and the compressed air forces the chemical sealant of the can to push the wing of the plug so that the at least one conduit of the tube communicates with the accommodation chamber of the can, such that the chemical sealant of the can flows out of the first slit via the tube, the at least one conduit, and the first trench and is delivered to the supply pipe.

11. The air compressor system as claimed in claim 2, wherein the tube comprises:
a hollow portion,
a notch defined at an end of the tube,
an opening defined on an opposing end of the tube,
at least two spaced first ribs arranged on an outer wall of the end of the tube,
at least two second ribs,
at least two third ribs,
a first trench defined between the at least two first ribs and the at least two second ribs, and
a second trench defined between the at least two second ribs and the at least two third ribs,
wherein the first trench has at least one aperture communicating with an interior of the tube, at least two first seal rings are defined between the at least two first ribs, at least two second seal rings are defined between the at least two second ribs, and at least two third seal rings are defined between the at least two third ribs,
wherein the tube further comprises two opposing troughs and at least one conduit which are defined on the opposing end of the tube, a plug configured to close the opening of the tube, the plug comprising two opposing locking portions corresponding to the opposing troughs, and the plug further comprising a wing configured to turn on or off the at least one conduit of the tube;
wherein the tube is disposed in the second sub-tube and extends out of the central orifice of the shoulder, and the at least two third ribs of the tube contact the shoulder of the first sub-tube, the at least two first ribs of the tube abut against the multiple protrusions of the second sub-tube so that the at least two first ribs, the at least two second ribs, and the at least two third ribs of the tube are received in the second sub-tube and the first sub-tube of the cover, a first slit defined between the first trench and the second sub-tube, and a second slit defined between the second trench and the first sub-tube.

12. The air compressor system as claimed in claim 11, wherein:
at least one rail is formed on the inner wall of the rotary element, the at least one rail comprising two opposing slots defined on a start position of the rotation element, and a closed segment extending upward on another end of the rotation element;
the rotation element is accommodatable in the storage groove of the box, the rotation element configured to fit on the second sub-tube of the cover so that the two opposing columns of the second sub-tube enter into the two opposing slots of the rotation element so that the central stem of the rotation element is engaged in the notch of the tube, the rotation element rotatable along the at least one rail;
wherein when the rotation element is rotated downward to actuate the tube to move downward, the at least two third ribs of the tube unblock the central orifice of the shoulder of the cover, the at least two second ribs of the tube stop the air inlet pipe from communicating with the supply pipe without communicating through the accommodation chamber, so that compressed air flows into the accommodation chamber of the can via the second slit of the second trench of the tube and the central orifice of the shoulder of the cover, and the compressed air forces the chemical sealant of the can to push the wing of the plug so that the at least one conduit of the tube communicates with the accommodation chamber of the can, such that the chemical sealant of the can flows out of the first slit via the tube, the at least one conduit, and the first trench and is delivered to the supply pipe.

13. The air compressor system as claimed in claim 5, wherein a sleeve comprising a check film is fit on a distal end of the air inlet pipe, and the sleeve is configured to close the sealant supply device from the air compressor airtightly to prevent the chemical sealant of the sealant supply device from flowing back to the air compressor.

14. The air compressor system as claimed in claim 4, wherein a sleeve comprising a check film is fit on a distal end of the air inlet pipe, and the sleeve is configured to close the sealant supply device from the air compressor airtightly to prevent the chemical sealant of the sealant supply device from flowing back to the air compressor.

15. The air compressor system as claimed in claim 2, wherein the sealant supply device further comprises an engagement portion, and an operation portion of the engagement portion of the sealant supply device is disposed on the air inlet pipe, and the engagement portion of the sealant supply device is fixable on a lock plate of the air outlet pipe.

16. The air compressor system as claimed in claim 4, wherein the sealant supply device further comprises an engagement portion, and an operation portion of the engagement portion of the sealant supply device is disposed on the air inlet pipe, and the engagement portion of the sealant supply device is fixable on a lock plate of the air outlet pipe.

* * * * *